(12) United States Patent
Makita

(10) Patent No.: US 11,601,627 B2
(45) Date of Patent: Mar. 7, 2023

(54) APPARATUS, CONTROL METHOD, AND STORAGE MEDIUM

(71) Applicant: CANON KABUSHIKI KAISHA, Tokyo (JP)

(72) Inventor: Koji Makita, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/376,000

(22) Filed: Jul. 14, 2021

(65) Prior Publication Data
US 2022/0030207 A1 Jan. 27, 2022

(30) Foreign Application Priority Data

Jul. 22, 2020 (JP) .............................. JP2020-125167

(51) Int. Cl.
*H04N 9/31* (2006.01)
*G03B 21/14* (2006.01)
*G06T 7/50* (2017.01)
*H04N 13/117* (2018.01)

(52) U.S. Cl.
CPC ......... *H04N 9/3185* (2013.01); *G03B 21/147* (2013.01); *G06T 7/50* (2017.01); *H04N 9/3176* (2013.01); *H04N 13/117* (2018.05)

(58) Field of Classification Search
CPC . G06T 7/0017; G06T 7/11; G06T 7/20; G06T 7/50; G06T 7/70; G06T 7/74; G06T 3/005; G06T 3/0056; G06T 3/0062; G06T 3/0093; G06T 3/40; G03B 21/14; G03B 21/145; G03B 21/147; G03B 21/208; H04N 9/3182; H04N 9/3185; H04N 9/3188; H04N 9/3194
See application file for complete search history.

(56) References Cited

U.S. PATENT DOCUMENTS

| 10,777,010 | B1* | 9/2020 | Patel ..................... G06T 15/50 |
| 11,144,763 | B2* | 10/2021 | Yamasaki ............. G06V 20/53 |
| 2019/0340807 | A1* | 11/2019 | Suzuoki ................... G06T 7/97 |
| 2021/0117651 | A1* | 4/2021 | Kotake ................ G06V 40/169 |
| 2021/0402616 | A1* | 12/2021 | Furihata ................. B25J 9/162 |

FOREIGN PATENT DOCUMENTS

JP 2008017348 A 1/2008

* cited by examiner

*Primary Examiner* — Sultan Chowdhury
(74) *Attorney, Agent, or Firm* — Canon U.S.A., Inc. IP Division

(57) ABSTRACT

An apparatus includes a projection unit configured to project a video image, a capturing unit configured to capture an image, an identification unit configured to identify a shape of a surface onto which the video image is to be projected, based on the captured image, an inference unit configured to infer a viewpoint position and an attitude of a viewer of the video image based on the captured image, a correction unit configured to correct the video image based on the shape of the surface and the viewpoint position and the attitude of the viewer, and a control unit configured to control the projection unit to project the corrected video image.

8 Claims, 3 Drawing Sheets

APPARATUS, CONTROL METHOD, AND STORAGE MEDIUM

BACKGROUND OF THE DISCLOSURE

Field of the Disclosure

The aspect of the embodiments relates to an apparatus, a control method, and a storage medium.

Description of the Related Art

As a method for displaying a video image without using an electronic display, there is known a method in which a video image is projected onto a surface such as a wall by using a projector. A typical projector projects a video image on the assumption that a projection surface onto which the video image is to be projected is a flat surface. Thus, in a case where the projection surface is a non-flat surface, the projected video image is geometrically distorted. To solve the issue, for example, Japanese Patent Application Laid-Open No. 2008-17348 discusses a method in which a projector and a spherical screen serving as a projection surface are physically connected by an arm, and the relative position and attitude are measured by an angle sensor, so that a video image without distortion can be displayed to a viewer.

However, in a case where a projector is used in a general house, it is often difficult to install a dedicated screen and an apparatus for physically connecting the projector and the screen, in terms of room size and cost. Furthermore, even in a case where a video image is projected onto a non-flat surface, a magnetic sensor is attached to a viewer or a camera is attached to the screen side in order to acquire a viewpoint position of the viewer. Thus, there is an issue where the projection of a video image cannot be easily performed using a surface, such as a room wall, as a screen.

SUMMARY OF THE DISCLOSURE

According to an aspect of the embodiments, an apparatus includes a projection unit configured to project a video image, a capturing unit configured to capture an image, an identification unit configured to identify a shape of a surface onto which the video image is to be projected, based on the captured image, an inference unit configured to infer a viewpoint position and an attitude of a viewer of the video image based on the captured image, a correction unit configured to correct the video image based on the shape of the surface and the viewpoint position and the attitude of the viewer, and a control unit configured to control the projection unit to project the corrected video image.

Further features of the disclosure will become apparent from the following description of exemplary embodiments with reference to the attached drawings.

DESCRIPTION OF THE EMBODIMENTS

Exemplary embodiments of the disclosure will be described in detail below with reference to the accompanying drawings.

The exemplary embodiments described below are examples as implementation means of the disclosure, and may be modified or changed appropriately depending on a configuration of an apparatus to which any of the exemplary embodiments of the disclosure is applied and various kinds of conditions. Furthermore, the exemplary embodiments can be combined as appropriate.

<Configuration of Projector>

In a first exemplary embodiment, a projector that is installed on a ceiling and has a function of using an omnidirectional camera to measure the shape of a projection surface onto which a video image is to be projected and to measure the position and attitude of a viewer of the video image will be described.

Figure 1:
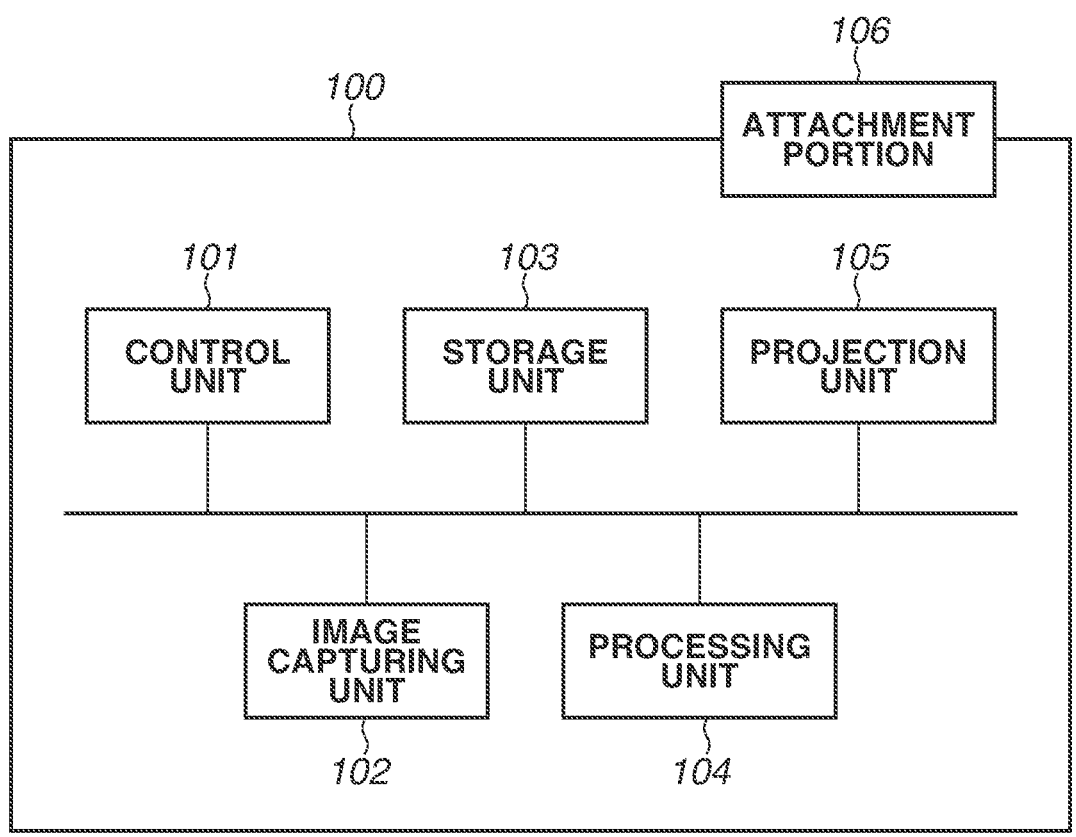
FIG. 1 is a diagram illustrating a configuration example of a projector according to an exemplary embodiment of the disclosure.

FIG. 1 is a block diagram illustrating a configuration example of a projector 100 that is an example of a projection apparatus according to the present exemplary embodiment. The projector 100 includes a control unit 101, an image capturing unit 102, a storage unit 103, a processing unit 104, and a projection unit 105.

The control unit 101 controls each of the units of the projector 100 based on input signals and programs (described below). The control unit 101 is implemented by, for example, a central processing unit (CPU). In place of the control unit 101, a plurality of pieces of hardware may share processing to control the entire apparatus.

The image capturing unit 102 is a camera that captures an image of a person present in an environment where the projector 100 is installed, and captures an image of a projection surface onto which a video image is to be projected. The image capturing unit 102 includes, for example, an optical lens unit, an optical system that controls the aperture, zoom, and focus, and an image sensor that converts light (video signal) introduced through the optical lens unit, into an electric video signal. As the image sensor, a complementary metal-oxide semiconductor (CMOS) image sensor or a charge-coupled device (CCD) image sensor is typically used. The control unit 101 controls the image capturing unit 102 to convert the object light formed by a lens included in the image capturing unit 102, into an electric signal by using the image sensor, perform processing such as noise reduction processing, and output digital data as image data. The image capturing unit 102 according to the present exemplary embodiment further includes an omnidirectional mirror. The omnidirectional mirror specularly reflects light from all directions (360 degrees) around the projector 100, thereby guiding the light to the image sensor. As the omnidirectional mirror, for example, a hyperboloidal mirror, a spherical mirror, or a circular fisheye lens is usable.

The storage unit 103 is a nonvolatile memory that stores video data to be projected by the projector 100. The video data may be prestored or may be acquired from outside.

The processing unit 104 performs image processing and compression processing on the image data output from the image capturing unit 102, and is implemented by, for example, a CPU. Alternatively, the processing unit 104 may be implemented by a graphics processing unit (GPU) specializing in image processing. Further alternatively, the processing unit 104 may be implemented by the CPU and the CPU cooperating with each other. The processing unit 104 outputs the processed image data. The image data output from the image capturing unit 102 represents an omnidirectional image of all directions around the projector 100. Thus, the image processing by the processing unit 104 includes correction processing for correcting distortion of the omnidirectional image and panoramically expanding the resultant image. In the present exemplary embodiment, an image represented by the image data subjected to the correction processing is referred to as a "panoramically expanded image".

The image processing is not limited to the distortion correction processing. The image processing may include blur correction processing for correcting artifacts of the image due to shake caused by the driving of a projection lens of the projector 100 or the driving of a heat exhaust fan (not illustrated). Furthermore, luminance correction processing for correcting luminance of the image, color correction processing for correcting colors of the image, range correction processing for correcting a dynamic range of the image, and other processing may be performed.

In addition, the processing unit 104 processes the image acquired by the image capturing unit 102, and calculates the position and attitude of a person present in the environment where the projector 100 is installed. Furthermore, the processing unit 104 performs video image conversion processing that calculates the shape of the projection surface onto which the video image is to be projected and corrects distortion of the video image.

The projection unit 105 includes a liquid crystal panel, a driver for the liquid crystal panel, a lens, a driving system for zooming and other functions, and a light source. The projection unit 105 receives the video image output from the processing unit 104 and projects the video image. The projection unit 105 can also project the data stored in the storage unit 103.

An attachment portion 106 is a member attachable to, for example, a hooking embedded ceiling rosette on a ceiling. In addition, power can be drawn from the ceiling rosette. The drawn power is fed to each of the units through a feeder circuit (not illustrated). If the projector 100 is attached to the ceiling rosette, a lamp cannot be attached to the ceiling rosette. Thus, the projector 100 may further include an illumination lamp in addition to a projection lamp. The projector 100 may further include a ceiling rosette, and the other ceiling lamp may be attached to the projector 100. In this case, the feeder circuit is connected to the ceiling rosette, and the power is also supplied to the attached ceiling lamp.

The above is the description of the projector 100.

Figure 2:
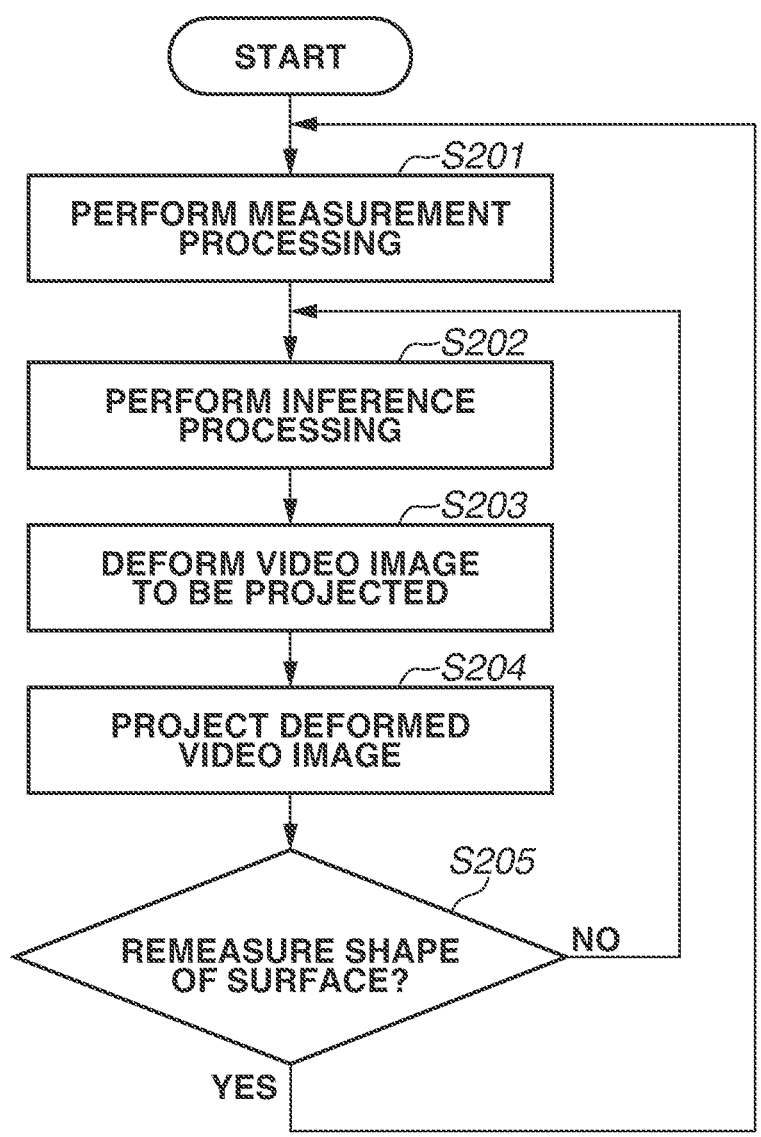
FIG. 2 is a flowchart illustrating an operation performed by the projector according to the exemplary embodiment.

Subsequently, operation of the projector 100 will be described. FIG. 2 is a flowchart illustrating the operation of the projector 100. Processing in the flowchart is started, for example, when the projector 100 is turned on or when an instruction to start projection is issued. Since the projector 100 according to the present exemplary embodiment is installed on a ceiling, it is difficult for a user to directly touch and operate a main body of the projector 100. Accordingly, a communication unit (not illustrated) of the projector 100 receives an instruction transmitted from a remote controller. The communication unit may accept wireless communication using infrared rays, or may accept wireless communication using Bluetooth® Low Energy. In a case where the communication unit accepts wireless communication using Bluetooth® Low Energy, the communication unit includes a chip, a module, and an antenna for the communication. In this case, the remote controller is not limited to a remote controller dedicated for the projector 100. A remote control application may be installed in a mobile terminal such as a smartphone and connected to the communication unit through Bluetooth® Low Energy, and the communication unit may receive a user operation through a graphical user interface (GUI) of the remote control application.

First, in step S201, the control unit 101 controls execution of measurement processing for measuring the shape of the projection surface onto which the video image is to be projected. In the measurement processing, a method discussed in "A Realtime and Adaptive Technique for Projection onto Non-Flat Surfaces Using a Mobile Projector Camera System", IPSJ SIG Technical Report, Vol. 2011-EC-19 No. 19 is used.

Processing in step S201 will be described more specifically. First, the control unit 101 controls the projection unit 105 to project a checkerboard pattern from the projector 100. The checkerboard pattern is a pattern in which white squares and black squares are alternately arranged. Next, the control unit 101 controls the image capturing unit 102 to capture and acquire an image of the projected checkerboard pattern. Since the image capturing unit 102 is the omnidirectional camera, the image capturing unit 102 captures the image without particularly taking an imaging direction into consideration. Since the image data output from the image capturing unit 102 is an omnidirectional image, the processing unit 104 applies the panoramic expansion processing to the output image data so that processing to be described below can be performed. A known algorithm can be used to panoramically expand the omnidirectional image.

Next, the processing unit 104 detects, from the acquired image, intersections of the checkerboard pattern as feature points. Then, the processing unit 104 detects edges of the checkerboard pattern that connect the detected intersections.

Then, the processing unit 104 groups the intersections connected by the detected edges, calculates positions of the intersections on the checkerboard pattern for each group by using epipolar geometry, and associates the positions of the intersections with the checkerboard pattern.

The above is the description of the processing in step S201.

Subsequently, in step S202, the control unit 101 controls the processing unit 104 to calculate the position and attitude of a viewer of the video image. In the present exemplary embodiment, the position and attitude of the viewer of the video image are calculated by execution of inference processing using a trained model. Specific examples of an algorithm used in the model include nearest neighbor algorithm, naive Bayes algorithm, a decision tree, and a support vector machine. Specific examples of the algorithm also include deep learning that uses a neural network to automatically generate the feature amount and the combined weight coefficient for learning. A usable algorithm among the above-described algorisms can be appropriately used and applied to the present exemplary embodiment. In the following description, a case where the model is generated by deep learning using a deep neural network (DNN) will be described as an example. The DNN used herein can be updated by using network data or data in a universal serial bus (USB) memory.

In the inference processing according to the present exemplary embodiment, the trained model that is trained in advance by deep learning using a group of images captured with various positions and attitudes is used. The learning is performed in a product manufacturing process in advance by using images with sufficient attitude variations as input data and using data regarding the position and attitude of the viewpoint of the viewer corresponding to each of the images as teacher data.

In step S202, the control unit 101 controls the processing unit 104 to calculate data regarding the position and attitude of the viewpoint of the viewer of the video image. First, the image captured by the image capturing unit 102 and panoramically expanded by the processing unit 104 is input as the input data for the trained model in the inference processing to be performed by the processing unit 104. It is expected that the viewer of the video image to be projected by the projector 100 appears in the input image. Then, the inference processing using the trained model is performed to output the data regarding the position and attitude of the viewpoint of the viewer of the video image to be projected by the projector 100 (hereinafter also referred to as the position and attitude data). The position and attitude data is relative information with the position and attitude of the projector 100 as an origin. For example, a projection direction of the projector 100 is set as an X direction, a direction that is along a horizontal plane of the projector 100 and is perpendicular to the projection direction is set as a Y direction, a top surface direction of the projector 100 is set as a Z direction, and the center of the projector 100 is set as the origin. The position and attitude data represents the distance and orientation of the viewpoint position of the viewer relative to the origin, and contains the numerical values of the coordinates of the XYZ axes, and the numerical values of the yaw, roll, and pitch of the attitude.

In this example, the case has been described where the trained model has been trained so as to use the image captured by the image capturing unit 102 and panoramically expanded by the processing unit 104 as the input data, and to output the position and attitude data of the viewer of the video image to be projected by the projector 100. However, the trained model is not limited thereto. For example, a trained model that uses the image captured by the image capturing unit 102 and panoramically expanded by the processing unit 104 as input data and outputs a partial image obtained by extracting the head area of the viewer from the image, and a trained model that uses the partial image as input data and outputs the position and attitude data of the viewer may be used to cooperate with each other. In this case, the former model is generated in advance in the product manufacturing process by learning using images with sufficient attitude variations as input data and using the partial image of the head area corresponding to each of the images as teacher data. The latter model is generated by learning using the partial images output from the former model as input data and using the position and attitude data corresponding to each of the partial images as teacher data. This makes it possible to further enhance the accuracy of the inference processing for inferring the position and attitude.

Figure 3:
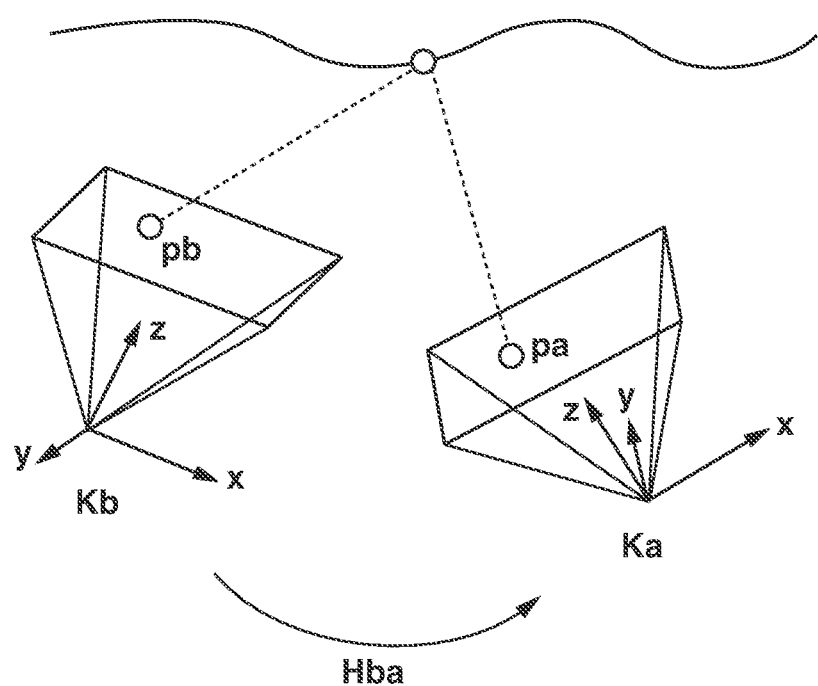
FIG. 3 is a diagram illustrating a relationship among the projector, a viewpoint, and holography.

Next, in step S203, the control unit 101 controls the processing unit 104 to deform the video image to be projected. In the present exemplary embodiment, the video image is deformed by using the method discussed in "A Realtime and Adaptive Technique for Projection onto Non-Flat Surfaces Using a Mobile Projector Camera System", IPSJ SIG Technical Report, Vol. 2011-EC-19 No. 19 described above. A specific procedure to deform the video image will be described with reference to FIG. 3. FIG. 3 illustrates a relationship among the projector 100, the viewpoint, and holography.

Before the procedure to deform the video image to be projected onto a non-flat surface is described, a procedure performed when the projection surface onto which the video image is to be projected is one flat surface will be described first. In this case, the video image can be deformed by homography represented by the following expression (1):

$$pa = Ka \cdot Hba \cdot Kb \cdot pb \quad (1)$$

In the expression (1), a point pa in an image to be projected can be calculated from a point pb in an image on a projection destination, using the following three types of matrices Ka, Hba, and Kb. Here, Ka is a parameter matrix of the projector 100, Kb is a parameter matrix of the viewpoint, and Hba is a homography matrix for transforming the position and attitude of the viewpoint into the position and attitude of the projector 100. The matrix Ka is an internal parameter acquired in advance by calibration using a method by Zhang or other methods. The matrix Ka is a transformation matrix for calculating, in a case where the position and attitude of the projector 100 and a point of interest in a three-dimensional space are known, two-dimensional coordinates of the point in the image to be projected, from three-dimensional coordinates of the point. Numerical values in the transformation matrix depend on the focal length (field angle) and lens distortion.

The matrix Kb is an "internal parameter" of when the human views an image, and is prepared in advance, for example, with setting of the focal length (field angle) equal to the focal length (field angle) of the projector 100 and setting of no lens distortion.

The matrix Hba is calculated by the following expression (2):

$$Hba = R - (t \cdot n^T)/d \quad (2)$$

R and t are parameters calculated from the value of the position and attitude of the viewpoint of the viewer that is calculated using the position and attitude of the projector 100 as the origin. R represents rotational movement of the position and attitude of the viewpoint of the viewer with respect to the position and attitude of the projector 100. t represents parallel movement of the position and attitude of the viewpoint of the viewer with respect to the position and attitude of the projector 100.

In addition, n and d are both parameters of the flat surface. n is a normal vector of the flat surface, and $n^T$ is a transposed vector of the normal vector n. d is a distance from the projector 100 to the flat surface.

The normal vector n and the distance d are calculated using a method discussed in "Dynamic Geometry Reconstruction Technique for Mobile Devices Using Adaptive Checkerboard Recognition and Epipolar Geometry" (https://www.jstage.jst.go.jp/article/transinf/E94.D/2/E94.D_2_336/_pdf/-char/ja) cited in "A Realtime and Adaptive Technique for Projection onto Non-Flat Surfaces Using a Mobile Projector Camera System", IPSJ SIG Technical Report, Vol. 2011-EC-19 No. 19. An outline of the procedure will be described below.

First, the above-described matrices Ka and Kb are acquired. The position and attitude of the projector 100 (which is the origin in this example) and the position and attitude of the viewpoint of the viewer (which is the result obtained by the inference processing in step S202 in this example) are further acquired.

Next, pattern light is projected based on the matrices Ka and Kb, the position and attitude data of the projector 100, and the position and attitude data of the viewpoint of the viewer, and is associated with feature points.

Subsequently, the respective three-dimensional positions of the feature points are calculated using epipolar geometry.

Then, a plurality of (three or more) points each having a known three-dimensional position is selected, and a local surface P is set.

A surface expression of the local surface P is calculated, and the normal vector n is calculated ($|n|=1$) by using the surface expression.

The distance d is calculated from the local surface P and the position and attitude data of the projector 100.

The matrix Hba is calculated in the above-described manner.

Using the matrix Hba allows the projector 100 to determine the point pa in the image to be projected so that the image can be projected onto the point pb that can be viewed, from the viewpoint position of the viewer, as if projected onto a flat surface.

The above-described method is an example of the method that is used when the projection surface onto which the video image is to be projected is one flat surface. By application of this method, a procedure used when the projection surface onto which the video image is to be projected is any non-flat surface will be described. In a case where the projection surface is any non-flat surface, the shape acquired in step S201 described above is used. More specifically, the video image is deformed by the following procedures (1) and (2).

In the procedure (1), a rectangle area within which the video image falls when viewed from the viewpoint of the viewer is determined. In the procedure (2), the image to be projected is generated by associating the pixels of the image to be projected and the pixels of the original image. The above-described procedure (2) will be described in detail.

When attention is paid on one of triangles each formed by three intersections of the checkerboard pattern as the feature points on any non-flat surface described above, the triangle can be approximated to be a substantially uniform flat surface. Thus, as far as the pixels inside the triangle are concerned, it is possible to perform processing similar to the method used in the above-described case where the projection surface is one flat surface. Performing the processing on all the triangles makes it possible to deform the video image to be projected by the projector 100 even in a case where the projection surface is any non-flat surface.

In step S204, the control unit 101 controls the projection unit 105 to project the video image deformed in step S203. As a result, even in a case where the video image is projected onto a surface including irregularities, it is possible to project the video image that can be viewed, from the viewpoint of the user, as if projected onto a flat surface.

Subsequently, in step S205, the control unit 101 determines whether to remeasure the shape of the projection surface. In the present exemplary embodiment, the control unit 101 determines whether to perform the remeasurement based on whether a remeasurement button has been pressed using the remote controller for controlling the projector 100. In a case where the remeasurement is to be performed (YES in step S205), the processing proceeds to step S201. In a case where the remeasurement is not to be performed (NO in step S205), the processing proceeds to step S202, and the position and attitude of the user is recalculated by using the calculated surface information, so that a change in the position and attitude of the user is tracked.

In parallel with these processing, the control unit 101 determines whether an instruction to end the projection or an instruction to turn off the projector 100 has been received from the user. In a case where the control unit 101 determines that the end instruction or the turn-off instruction has been received, the processing in the flowchart in FIG. 2 is interrupted, and the control unit 101 performs end processing for stopping each of the units, thereby stopping the operation of the projector 100. In the present exemplary embodiment, the use of the projector 100 is finished when an end button of the remote controller for controlling the projector 100 is pressed to input the instruction to turn off the projector 100. Likewise, the projection is stopped when the remote controller is used to input the instruction to end the projection.

When the projection is ended, the shape of the projection surface measured in step S201 is stored in the nonvolatile memory. This eliminates the necessity to remeasure the shape of the projection surface when the projector is used again. Thus, the processing in step S201 is not performed unless the user issues an instruction to measure the shape of the projection surface again. Whether to perform the processing in step S201 is switched, for example, based on determination by the control unit 101 about whether the measurement result of the shape of the projection surface has been recorded in the nonvolatile memory.

As described above, the projector 100 according to the present exemplary embodiment includes the camera, and uses the image captured by the camera to calculate the shape of the projection surface and the viewpoint of the viewer. This can save the user from having to prepare a screen, attach a sensor to the user, or the like. Simply installing the projector 100 makes it possible to project, onto a user's desired surface, the video image that is easily recognizable as a flat image by the user.

In the above description, the image captured by the image capturing unit 102 and panoramically expanded by the processing unit 104 is used as the input data in the inference processing using the trained model. This is because using the panoramically expanded image not only in the calculation of the shape of the projection surface, but also in the inference processing can improve efficiency. Basically, the projector 100 is hardly moved after installation. In other words, calculating the shape of the projection surface once is sufficient unless the projector 100 is moved. In contrast, the position and attitude of the viewer of the projected content are continuously changed. Thus, the position and attitude of the viewer are to be calculated more frequently than the shape of the projection surface. For example, if a curtain is used as the projection surface, the projection surface is daily changed. Also even in this case, the frequency of change in the shape of the projection surface is lower than the frequency of change in the position and attitude of the viewer. Thus, in the inference of the position and attitude of the viewer, the omnidirectional image before the panoramic expansion processing may be used as the input data. This eliminates the necessity to perform the panoramic expansion processing every time the inference of the position and attitude of the viewer is repeated. In this case, the trained model is generated by learning using omnidirectional images as the input data and using the position and attitude data corresponding to each of the omnidirectional images as the teacher data.

In addition, in the above description, the projector 100 has been described assuming that the trained model has been generated in advance by the learning in the manufacturing stage. The timing of the learning, however, is not limited thereto. For example, the user may be notified of execution of the learning when the projector 100 is first activated after installation, and the learning may be performed based on characteristics of the user and a use environment of the user. In this case, the attitude data corresponding to the image is measured by using, for example, a wearable acceleration sensor attached to the user, and the measured data is used as the attitude data corresponding to the image. Also in this case, it is possible to achieve an effect of eliminating the necessity to attach the sensor to the user in a stage where the user views the content projected by the projector 100 after the learning.

Furthermore, in the above description, the case has been described where, if the remeasurement of the shape of the projection surface is not to be performed in step S205, the processing in steps S202 to S204 is repeated. However, when the position and attitude of the user are not largely changed in step S202, the deformation processing in step S203 may be skipped. This makes it possible to reduce a processing load.

Furthermore, in the above description, the case where a place where the video image is to be projected is fixed based on the installation position of the projector 100 has been described as an example. However, the place where the video image is to be projected is not limited thereto. For example, the place where the video image is to be projected may be determined based on the position and attitude of the viewer of the video image. In addition, in a case where the position of the viewer is changed by a certain amount or more, the place where the video image is to be projected may be automatically changed. Furthermore, since the place where the video image is to be projected is any non-flat surface, image deterioration due to correction of the video image is larger when the surface has larger irregularities. Thus, a partial area having high flatness may be automatically detected within an area where the video image can be projected, and the video image may be projected onto the detected partial area. The video image is projected as uniform luminance signals independent of positions of the pixels. However, the viewer of the video image freely moves. Thus, there is a case where a part of the video image cannot be projected onto the intended surface and is projected onto the viewer. Thus, the projector 100 may be configured not to project the video image onto the area where the viewer is present. Alternatively, the projector 100 may perform processing for reducing the luminance of the video image in the area where the viewer is present, thereby reducing the influence in a case where the video image directly comes into sight of the viewer.

Furthermore, the above description is based on the assumption that the viewer appears in the image used in the calculation of the position and attitude of the viewpoint of the viewer. However, there may be a case where a plurality of persons appears in the image. In particular, since the omnidirectional image is captured, a person other than the viewer can also be captured easily. The position where the video image to be projected onto an uneven surface can be viewed as if projected onto a flat surface is one, in principle. Thus, in a case where a plurality of persons appears in the image, one person is identified as the viewer among the plurality of persons based on a predetermined condition. There is a high possibility that the viewer of the video image faces toward the projection destination of the projector 100. If not, there is a high possibility that the viewer faces toward the projector 100. Thus, in a case where a plurality of persons appears in the image, any one of the persons may be identified as the viewer by inferring the position and attitude of each of the persons using the trained model, and determining whether each of the persons faces toward the direction same as the projection direction of the projector 100. In a case where none of the persons face toward the direction same as the projection direction of the projector 100, the viewer may be identified by determining whether each of the persons faces toward the projector 100. In a case where the projector 100 is activated in response to an instruction from the remote control application of the smartphone connected through Bluetooth® Low Energy or in a case where the position and attitude of the viewpoint of the viewer are calculated in response to an instruction from the remote control application, the approximate position of the smartphone can be identified by measuring the communication direction and distance. It is reasonable to assume that the viewer issues the instruction. Thus, among the plurality of persons in the image, the person at the position closest to the approximately position of the smartphone that has transmitted the instruction may be identified as the viewer.

The above-described exemplary embodiment can also be implemented by supplying a program for implementing one or more functions according to the above-described exemplary embodiment to a system or an apparatus through a network or a storage medium, and causing a computer of the system or the apparatus to read out and execute the program. The computer may include one or a plurality of processors or circuits, and may include a plurality of separated computers, a plurality of separated processors, or a network of the circuits in order to read out and execute a computer-executable instruction.

The processors or the circuits may include a CPU, a micro-processing unit (MPU), a GPU, an application specific integrated circuit (ASIC), and a field programmable gate array (FPGA). Furthermore, the processors or the circuits may include a digital signal processor (DSP), a data flow processor (DFP), or a neural processing unit (NPU).

According to the above-described exemplary embodiment, the projector can be used more easily.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-125167, filed Jul. 22, 2020, which is hereby incorporated by reference herein in its entirety.

What is claimed is:

1. An apparatus comprising:
a projection unit configured to project a video image;
a capturing unit configured to capture an image, wherein the captured image is an omnidirectional image;
at least one processor that operates to:
identify a shape of a surface onto which the video image is to be projected, based on an image obtained by panoramically expanding the omnidirectional image;
infer, using a trained model, a viewpoint position and an attitude of a viewer of the video image based on the image obtained by panoramically expanding the omnidirectional image;
correct the video image based on the shape of the surface and the viewpoint position and the attitude of the viewer; and
control the projection unit to project the corrected video image.

2. The apparatus according to claim 1, wherein the processor infers the viewpoint position and the attitude of the viewer of the video image based on one of the omnidirectional image and the image obtained by panoramically expanding the omnidirectional image.

3. The apparatus according to claim 2, wherein the processor infers the viewpoint position and the attitude of the viewer of the video image by using a trained model that is trained by learning using one of the omnidirectional image and the image obtained by panoramically expanding the omnidirectional image as input data and using information regarding a viewpoint position and an attitude of a person in one of the omnidirectional image and the image obtained by panoramically expanding the omnidirectional image as teacher data.

4. The apparatus according to claim 1, further comprising a memory configured to record the shape of the surface,
wherein, in a case where the shape of the surface has already been recorded in the memory, the processor does not perform processing for identifying the shape of the surface.

5. A method for controlling an apparatus including a projection unit configured to project a video image and a capturing unit configured to capture an image, wherein the captured image is an omnidirectional image, the method comprising:
identifying a shape of a surface onto which the video image is to be projected, based on an image obtained by panoramically expanding the omnidirectional image;
inferring, using a trained model, a viewpoint position and an attitude of a viewer of the video image based on the image obtained by panoramically expanding the omnidirectional image;
correcting the video image based on the shape of the surface and the viewpoint position and the attitude of the viewer; and
controlling the projection unit to project the corrected video image.

6. The method according to claim 5, further comprising recording the shape of the surface,
wherein, in a case where the shape of the surface has already been recorded in the recording, the identifying does not perform processing for identifying the shape of the surface.

7. A non-transitory computer-readable storage medium storing a program for causing a computer to execute a method for controlling an apparatus including a projection unit configured to project a video image and a capturing unit configured to capture an image, wherein the captured image is an omnidirectional image, the method comprising:
identifying a shape of a surface onto which the video image is to be projected, based on an image obtained by panoramically expanding the omnidirectional image;
inferring, using a trained model, a viewpoint position and an attitude of a viewer of the video image based on the image obtained by panoramically expanding the omnidirectional image;
correcting the video image based on the shape of the surface and the viewpoint position and the attitude of the viewer; and
controlling the projection unit to project the corrected video image.

8. The non-transitory computer-readable storage medium according to claim 7, further comprising recording the shape of the surface,
wherein, in a case where the shape of the surface has already been recorded in the recording, the identifying does not perform processing for identifying the shape of the surface.

* * * * *